United States Patent [19]

Schulz et al.

[11] 4,226,972
[45] Oct. 7, 1980

[54] PROCESS FOR PREPARING POLY(ORGANOPHOSPHAZENES) FROM SOLUBLE OR GELLED POLY(DICHLOROPHOSPHAZENES)

[75] Inventors: Donald N. Schulz, Hartville; Jung W. Kang, Clinton, both of Ohio; John W. Spiewak, Webster, N.Y.

[73] Assignee: The Firestone Tire & Rubber Company, Akron, Ohio

[21] Appl. No.: 957,398

[22] Filed: Nov. 3, 1978

[51] Int. Cl.³ .................. C08G 79/02; C08G 73/00
[52] U.S. Cl. .................................... 528/168; 528/228; 528/243; 528/246; 528/266; 528/361; 528/362; 528/363; 528/374; 528/378; 528/380; 528/391; 528/392; 528/399
[58] Field of Search ............... 528/168, 399, 157, 228, 528/361, 374, 243, 266, 394, 378, 380, 391, 392, 363, 362, 246; 544/282

[56] References Cited

U.S. PATENT DOCUMENTS 3,893,980  7/1975  Allcock et al. ..................... 528/321

FOREIGN PATENT DOCUMENTS 48-32800  9/1973  Japan ........................... 528/399
1121924   7/1968  United Kingdom .................. 544/282
1474600   5/1977  United Kingdom .................. 528/399

*Primary Examiner*—Wilbert J. Briggs, Sr.

[57] ABSTRACT

Poly(organophosphazenes) containing repeating units of the structure:

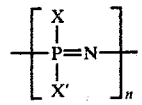

wherein X and X' represent organic substituents which may be the same or different and n is from 20 to 50,000, are prepared by a process which involves reacting a poly(dichlorophosphazene) having the formula —(NPCl₂)ₙ—, in which n is from 20 to 50,000, with an active hydrogen-containing compound in the presence of a bicyclic amidine represented by the structure:

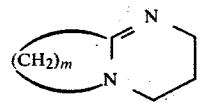

in which m is an integer of from 1 to 10.

A unique aspect of the process of the invention is that it can be utilized to prepare such poly(organophosphazenes) utilizing either soluble or gelled (insoluble) poly(dichlorophosphazenes) as starting materials.

12 Claims, No Drawings

PROCESS FOR PREPARING POLY(ORGANOPHOSPHAZENES) FROM SOLUBLE OR GELLED POLY(DICHLOROPHOSPHAZENES)

BACKGROUND OF THE INVENTION

This invention relates to a process for the preparation of poly(organophosphazenes). More particularly, the invention relates to a process for preparing poly(organophosphazenes) which involves reacting a poly(dichlorophosphazene) with an active hydrogen-containing compound in the presence of a bicyclic amidine (described below).

Poly(organophosphazenes) to which the process of this invention is directed are polymers characterized by repeating units of the structure:

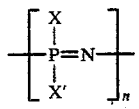

in which X and X' represents organic substituents which may be the same or different groups derived from active hydrogen-containing compounds and in which n is from 20 to 50,000. As will be evident, when X and X' in the above formula are the same, homopolymers are produced, whereas when X and X' are different, copolymers are produced.

The process of the invention is particularly advantageous in preparing poly(organophosphazenes) in which X and X' in the above formula represent substituted or unsubstituted alkoxy or aryloxy groups; i.e., polymers containing repeating units of the structure;

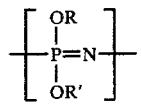

in which R and R' may be the same or different and are substituted or unsubstituted alkyl or aryl radicals.

Conventional processes for the preparation of poly(organophosphazenes) from poly(dichlorophosphazenes) are described in numerous prior art patents and publications as illustrated, for example, by the publications "Phosphorus-Nitrogen Compounds" Academic Press, New York, New York 1972 by H. R. Allcock and "Poly(Organophosphazenes)" Chemtech, Sept. 19, 1975 by H. R. Allcock. As described in the foregoing publications, poly(organophosphazenes) are in general prepared from poly(dichlorophosphazene) polymers by a nucleophilic substitution reaction in which the chlorine atoms on the poly(dichlorophosphazene) polymer are displaced by the desired substituents. This reaction process is commonly referred to as derivatization by those active in the polyphosphazene polymer art.

As specifically described in the aforementioned publications, the general procedure for preparing poly(organophosphazenes) in which the organic substituents are alkoxy or aryloxy groups involves reacting a poly(dichlorophosphazene) with the sodium salt of an aliphatic or aromatic alcohol, i.e., a sodium alkoxide or aryloxide. The process described in the aforementioned publications is advantageous in many respects and permits the production of poly(organophosphazene) polymers containing various alkoxy and aryloxy substituents. However, the process described in these publications suffers from several serious disadvantages.

Thus, the first step in such processes involves the preparation of the sodium alkoxide or aryloxide of the desired aliphatic or aromatic alcohol. As described in the prior processes, this is ordinarily accomplished by reacting the aliphatic or aromatic alcohol with metallic sodium in an inert solvent.

As will be evident, the use of metallic sodium in the preparation of the alkoxide or aryloxide presents a number of significant disadvantages. Thus, as is well known, the use of metallic sodium requires extreme care in handling in order to prevent potential explosion problems. In this regard, it is necessary to rigorously exclude moisture from the reaction system.

Thus, the preparation of poly(organophosphazenes) in which the organic substituent is an alkoxy or aryloxy group in accordance with prior processes basically involves a two-step process, i.e., (1) prepare the dry alkoxide and (2) react the alkoxide with the poly(dichlorophosphazene) polymer. As will be apparent, such a two-step process requires not only careful handling but is time consuming.

The use of metallic sodium in such processes presents still further disadvantages. For example, the use of sodium has the additional disadvantage that undesirable side reactions often occur. Thus, in some instances, it may be desirable to attach a functional group-containing substituent (e.g., an amino acid, nitrophenol, hydroxy acid etc.) to the phosphazene backbone of the polymer to provide a site for subsequent reaction such as crosslinking, grafting and the like. However, the use of sodium in such a derivatization reaction is generally undesirable since side reactions between the sodium and the functional group can readily occur.

Other processes for preparing poly(organophosphazenes) of the above structure from poly(dichlorophosphazenes) which are less frequently employed involve reacting the poly(dichlorophosphazene) with the desired alcohol in the presence of a tertiary amine such as triethylamine or pyridine. Such processes are described, for example, in U.S. Pat. No. 3,893,980; Japanese Patent publication 73-32800, filed Nov. 28, 1970 and the article entitled "Phosphonitrilic Trifluoroethoxide High Polymer" by M. V. Lenton, B. Lewis and C. A. Pearce appearing in the publication *Chemistry and Industry*, dated Aug. 1, 1964.

The processes described in the aforementioned patents and publications (hereinafter referred to as tertiary amine processes for convenience) are advantageous in a number of respects in comparison to the sodium processes described above. Thus, the tertiary amine processes are one-step processes in which the handling problems associated with sodium are substantially obviated and in which side reactions are virtually eliminated or at least greatly minimized. However, while the tertiary amine processes exhibit such advantages in comparison to the sodium processes, they have also been found to suffer from several significant disadvantages.

Thus, it has been found that in some instances the tertiary amine process produces poly(organophosphazene) polymers having a lower than desired degree of substitution (i.e. polymers containing higher than desired residual chlorine levels). This is clearly indicated by Japanese Patent publication 73-32800 which discloses a process in which a first substituent (i.e.

phenoxy) is attached to the phosphorus atoms of a poly(dichlorophosphazene) by the tertiary amine process following which a second substituent (i.e. an unsaturated oxybenzoate ester) is attached to the phosphorus atoms of the poly(dichlorophosphazene) by the sodium process. The stated reason for utilizing both processes is to obtain a more complete substitution (i.e. low residual chlorine level). In addition, as illustrated in the aforementioned article by M. V. Lenton et al, the use of the tertiary amine processes in some instances produces polymer products which are at least partially crosslinked. Finally, in the tertiary amine process, the tertiary amine hydrochloride salt is formed as a by-product of the reaction. As illustrated in U.S. Pat. No. 3,893,980 to Allcock et al, this salt is difficult to separate from the polymer and numerous purification steps are often required to isolate the polymer.

SUMMARY OF THE INVENTION

In accordance with this invention, a process for the preparation of poly(organophosphazenes) having the above structure has been developed which virtually eliminates or substantially minimizes all of the foregoing disadvantages of the above prior art processes. The process involves reacting a poly(dichlorophosphazene) polymer having the formula —$(NPCl_2)_n$—, in which n is from 20 to 50,000, with an active hydrogen-containing compound (described below) or mixture of active hydrogen-containing compounds in the presence of a bicyclic amidine.

This new process is essentially a one-step process which eliminates the use of sodium or tertiary amines and the attendant problems encountered therewith. The process permits more rapid preparation of poly(organophosphazenes), easier removal of chloride salts from the final product, recovery of hydrogen chloride for possible recycling, and the preparation of a wider variety of products. In addition, it has been surprising and unexpectedly found that the process can be utilized to prepare poly(organophosphazenes) from gelled poly(dichlorophosphazenes) thereby permitting the use of material which would otherwise be wasted.

DETAILED DESCRIPTION OF THE INVENTION

As indicated, the process of this invention involves the reaction of a poly(dichlorophosphazene) polymer with an active hydrogen-containing compound or mixture of such compounds in the presence of a bicyclic amidine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula —$(NPCl_2)_n$—, in which n may range from 20 to 50,000 or more. As described in the aforementioned references, the polymers are in general prepared by the thermal polymerization of cyclic oligomers having the formula —$(NPCl_2)_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range 30 minutes to about 48 hours.

A preferred process for preparing the poly(dichlorophosphazene) polymers used in the process of this invention is described in the aforementioned incorporated U.S. Pat. No. 4,005,171.

II. THE ACTIVE HYDROGEN-CONTAINING COMPOUNDS

An extremely broad range of active hydrogen-containing compounds may be employed in the process of this invention. Thus, virtually any active hydrogen-containing compound which is capable of undergoing a nucleophilic substitution with the chlorine atoms of a poly(dichlorophosphazene) polymer in the presence of a bicyclic amidine can be utilized.

Illustrative examples of active hydrogen-containing compounds which may be employed include among others substituted and unsubstituted aliphatic alcohols, aromatic alcohols, polyether alcohols, amines, mercaptans, carbon acids and mixtures of such compounds. Many other active hydrogen-containing compounds will suggest themselves to those skilled in the art.

Aliphatic and aromatic alcohols which may be employed include substituted or unsubstituted and saturated or unsaturated aliphatic and aromatic alcohols.

Illustrative of aliphatic alcohols which may be employed are aliphatic alcohols having from 1 to 20 carbon atoms such as methanol, ethanol, propanol, isopropanol, n-butanol, sec-butanol, hexanol, dodecanol and the like; fluoro-substituted alcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3, 4,4,5,5-octafluoropentanol, 2,2,3,3,4,4,5,5,6,6,7,7-dodecafluoroheptanol and the like; and unsaturated aliphatic alcohols such as allyl alcohol, 3-butene-1-ol, 2,3,3-fluoropropen-1-ol and the like. Mixtures of the foregoing aliphatic alcohols may also be utilized.

Aromatic alcohols which may be employed include among others phenol; alkyl-substituted phenols such as cresols, xylenols, p-, o-, and m- ethyl and propyl phenols and the like; halogen-substituted phenols such as p-, o-, and m- chloro and bromo phenols and di- or tri-halogen substituted phenols and the like; alkoxy-substituted phenols such as 4-methoxyphenol, 4-(n-butoxy) phenol and the like; and unsaturated aromatic alcohols such as vinylphenols, allylphenols, eugenol, isoeugenol and the like. Mixtures of the foregoing aromatic alcohols may also be employed.

In addition to the above alcohols, polyether alcohols containing alkyl, aryl or mixed alkyl and aryl moieties may be employed. Thus, for example, polyether alcohols such as 2-(2-ethoxyethoxy)ethanol, 2-(2-butoxyethoxy)ethanol, 2-(2-phenoxyethoxy)ethanol, 2-(2-phenoxyethoxy-2-ethoxy) ethanol, octylphenoxy polyether alcohols, and nonylphenoxy polyether alcohols may be utilized.

Amines which may be employed include aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-anilines, alkoxy-substituted anilines and the like.

Mercaptans which may be employed include among others mercaptan compounds such as those described in U.S. Pat. No. 3,974,242 to Lanier et al, incorporated herein by reference. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

As indicated above, carbon acids may also be employed as active hydrogen-containing compounds in the process of this invention. These compounds which are often referred to as active methylene compounds are characterized by the presence of unsaturated functional groups such as nitro, carbonyl, cyano, sulfone or phenyl as substituents at a saturated carbon atom. The presence of such functional groups as substituents at the saturated carbon atom renders any hydrogen atoms bonded to that carbon atom acidic and therefore reactive with the chlorine atoms of the poly(dichlorophosphazene). Carbon acids or more commonly active methylene compounds are described in Chapter 7, pages 163–215 of the text entitled; "Modern Synthetic Reactions" by Herbert D. Hause, published by W. A. Benjamin Inc. copyright 1965, the disclosure of which is incorporated herein by reference. Illustrative examples of carbon acids which may be employed in the process of the invention include alkyl sulfones such as dimethyl sulfone, diethyl sulfone and the like; substituted or unsubstituted malononitriles such as malononitrile, methyl malononitrile, ethyl malononitrile, phenyl malononitrile and the like; nitroalkanes such as nitroethane, 2-nitropropane, 2-nitrobutane and the like and similar compounds.

III. THE BICYCLIC AMIDINE

As indicated, the use of the bicyclic amidine in the process of the invention is a very important feature of the invention.

Bicyclic amidines which may be employed in the process of the invention are those represented by the structure:

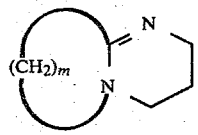

wherein m is an integer of from 1 to 10. The preferred bicyclic amidines are those in which n is 3 or 5. An especially preferred bicyclic amidine for use in the process of the invention is 1,5-diazabicyclo (5,4,0) undec-5-ene.

As indicated above, the use of bicyclic amidines in the process of the invention provides for a number of significant advantages over tertiary amine processes including faster reaction rate and a higher degree of organic substitution of the phosphazene polymer. Also, the bicyclic amidine process allows for easier chloride salt by product removal due to the fact that the amidine hydrochloride salt is much less soluble in the reaction medium than the tertiary amine hydrochloride salt. In addition as mentioned heretofore, a most surprising and unexpected aspect of the process of the invention is that it permits the use of gelled (i.e. insoluble) poly(dichlorophosphazenes) as starting materials.

As mentioned heretofore, poly(organophosphazenes) are prepared in accordance with the process of this invention by reacting the poly(dichlorophosphazene) polymer with an active hydrogen-containing compound in the presence of a bicyclic amidine.

The specific reaction conditions and proportion of ingredients employed in preparing the poly(organophosphazenes) can vary somewhat depending on factors such as the reactivity of the specific active hydrogen-containing compounds and the particular bicyclic amidene employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the chloropolymer to the corresponding esters of the reactant compounds.

The above reaction is ordinarily carried out in the presence of a solvent. The solvent employed in the reaction should be a solvent for the poly(dichlorophosphazene) polymer, the active hydrogen-containing compound and the bicyclic amidine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of active hydrogen-containing compounds employed in the process should be at least molecularly equivalent to the number of available chlorine atoms in the chloropolymer. However, if desired, an excess of such reactants may be employed in order to insure substantially complete reaction of all the available chlorine atoms.

The following examples are submitted for the purpose of further illustrating the nature of the present invention and are not intended as a limitation on the scope thereof. Parts and percentages referred to in the examples are by weight unless otherwise indicated.

The following examples (i.e. 1–6) compare the effects of tertiary amines and bicyclic amidenes in the preparation of a poly(organophosphazene) copolymer represented by the formula $[NP(OH_5C_6)(OH_4C_6H_5C_2-p)]$.

EXAMPLES 1–6

In these comparative examples, a series of beverage bottles were charged with anhydrous tetrahydrofuran (hereinafter THF) solvent (87–101 grams each), phenol, p-ethylphenol, a poly(dichlorophosphazene) polymer, [i.e., $(NPCl_2)_n$] having a degree of polymerization of about 2600 and the bases to be evaluated (i.e. tertiary amine or bicyclic amidene). All examples were worked up in a similar manner. Thus, during the derivatization reaction, the amine hydrochloride or amidene hydrochloride salt which formed was removed by filtration, the filtrate containing the derivatized polymer was coagulated in water and the coagulated polymer was washed or triturated with methanol. The reaction ingredients, ingredient proportions, and conditions are shown in Table I.

TABLE I

| Ex. No. | —(NPCL$_2$)$_n$— Meg* | C$_6$H$_5$OH Meg | *C$_2$H$_5$C$_6$H$_4$OH Meg | Base Type | Base Meg | Reaction Temp°C. | Reaction Time/hr |
|---|---|---|---|---|---|---|---|
| 1 | 78.8 | 45.4 | 45.4 | TEA[1] | 88.9 | 80 | 68 |
| 2 | 80.2 | 44.1 | 43.4 | TEA | 86.0 | 120 | 68 |
| 3 | 79.9 | 43.4 | 60.9 | TMEDA[2] | 103.3 | 80 | 68 |
| 4 | 78.9 | 42.8 | 43.8 | TMEDA | 86.0 | 120 | 68 |
| 5 | 79.9 | 44.0 | 43.7 | DBU[3] | 85.4 | 80 | 68 |
| 6 | 79.9 | 44.0 | 43.7 | DBU | 86.7 | 120 | 68 |

*milliequivalents
[1]triethylamine
Lhu (2)N,N,N',N'-tetramethylene diamine
[3]1,5-diazabicyclo(5,4,0) undec-5-ene During the above reaction runs, the rate of base hydrochloride salt formation was observed and the weight of base hydrochloride salt isolated was determined. Following completion of the reaction runs, the percent residual chlorine was determined to measure the degree of substitution achieved. Results are shown in Table II.

TABLE II

| Ex. No. | Rate of Base . HCL salt formation | Weight of Base . HCl salt isolated (grams) | % Residual Chlorine |
|---|---|---|---|
| 1 | slow | 39.2 | 19.46 |
| 2 | slow | 46.2 | 17.25 |
| 3 | moderate | 27.0 | 15.13 |
| 4 | moderate | 34.0 | 10.15 |
| 5 | fast | 74.9 | 3.41 |
| 6 | fast | 69.6 | 0.90 |

The above data indicates that when the bicyclic amidine 1,5-diazabicyclo(5,4,0)undec-5-ene (DBU) is used as base catalyst (Examples 5 and 6), the rate of formation of precipitate is faster, the amount of insoluble salt is greater and the amount of residual chlorine is less than in the cases of the tertiary amines, triethylamine (Examples 1 and 2) or TMEDA (Examples 3 and 4).

The following examples (i.e., 7-8) compare the effects of tertiary amines and bicyclic amidines in the preparation of a poly(organophosphazene) homopolymer represented by the formula [NP(O(CH$_2$C-H$_2$O)$_3$C$_6$H$_4$C$_8$H$_{17}$)$_2$].

EXAMPLES 7-8

In these examples, two bottles were charged with THF, an alkylaryl polyether alcohol represented by the formula C$_8$H$_{17}$C$_6$H$_4$(OC$_2$H$_4$)$_3$OH commercially available under the designation Triton X-35 from Rohm & Haas Co., and a THF solution of a poly(dichlorophosphazene) polymer having a degree of polymerization of about 2600. Then, triethylamine was charged to one of the bottles and DBU was charged to the other bottle. The contents of the bottles were then reacted utilizing a procedure substantially similar to that employed in Examples 1-6. The resultant derivatized polymers were isolated by water coagulation, and were vacuum dried. Reaction ingredients, ingredient proportions and conditions are shown in Table III.

TABLE III

| Ex. No. | —(NPCL$_2$)$_n$— mM* | Triton X-35 mM | Base Type | Base mM | Reaction Temp°C. | Reaction Time/hrs |
|---|---|---|---|---|---|---|
| 7 | 44 | 76 | TEA | 88 | 80 | 39 |
| 8 | 44 | 76 | DBU | 88 | 80 | 39 |

*millimoles

The derivatized polymers resulting from the above reactions were analyzed for percent phosphorus, percent chlorine and the glass transition temperatures (Tg) and average melting temperatures (Tm) determined. Tests results are shown in Table IV.

TABLE IV

| Ex. No. | % P | % Cl | Tg°C. | Tm°C. |
|---|---|---|---|---|
| 7 | 7.37 | 1.97 | −14 | 195 |
| 8 | 7.37 | 0.86 | −10.5 | 200 |

The above data shows that even in the case of a more reactive alcohol such as Triton X-35, the bicyclic amidine, DBU, provided more complete substitution than the tertiary amine, TEA.

The following example (i.e. Ex. 9) illustrates the use of the bicyclic amidine in the preparation of a poly(organophosphazene) copolymer represented by the formula [NP(OH$_4$C$_6$Cl)(OC$_6$H$_4$CH$_2$CH=CH$_2$)] from a gelled poly(dichlorophosphazene) polymer.

EXAMPLE 9

Into a 28 oz. bottle was charged 9.03 g (0.08 mol) of gelled (insoluble) chloropolymer in toluene, 20 g (0.149 mol) of o-allylphenol (OAP), 15 g (0.117 mol) of p-chlorophenol, and 22 g (0.145 mol) DBU. The batch was tumbled at 50° C. for 24 hours followed by 80° C. for 24 hours in hot water baths. Two oily phases were obtained, both phases contained polymer. The two layers were combined and redissolved in toluene and recoagulated in methanol and dried under vacuum. The polymer was also found to be soluble in CHCl$_3$ and THF. (DSV$_{THF}$=0.8, Gel=0) The polymer exhibited a Tg=+4° C. and broad endotherms at 100°-110° C. and 220°-230° C. NMR$_{CHCl_3}$ analysis of the copolymer showed 19% OAP, 81% Cl—C$_6$H$_4$O. Microanalysis of product Found: 45.34%C; 3.30%H; 5.61%N, 11.54%P, 21.4%Cl; Theory (based upon 80% Cl—C$_6$H$_4$O—, 20% oC$_6$H$_4$CH$_2$=CH$_2$): 45.88%C; 3.18%H; 4.48%N; 9.88%P; 22.62%Cl.

EXAMPLE 10

Attempted Derivitization of Gelled Chloropolymer using TEA

An attempt was made to repeat the process of Example 9 using TEA instead of DBU. The result was still gelled (insoluble) product.

The following example (i.e. Ex. 11) illustrates the use of the bicyclic amidine, DBU, in the preparation of a poly(organophosphazene) copolymer containing a substituent derived from a carbon acid (e.g. malononitrile).

EXAMPLE 11

To a 10 oz. bottle was charged 87.8 grams (100 ml) of dry THF, 14.0 grams (0.092 equivalents) of neat dry DBU, 3.0 grams (0.045 equivalents) of neat dry malononitrile and 44.8 grams (0.080 equivalents) of a 10.3 percent solids solution of poly(dichlorophosphazene) in THF.

An exotherm developed upon addition of the chloropolymer to the other ingredients and precipitation of the amidine salt also began to occur. The mixture was then heated at 120° C. for 3.5 hours. After this period, the mixture was cooled to room temperature and trifluoroethanol (0.067 equivalents) was charged. The mixture was then heated at 120° C. for 16 hours. The product/salt/solvent mixture was filtered.

Infrared analysis of the reaction filtrate indicated that both starting materials were consumed as evidenced by the fact that no P-Cl or nitrile absorptions were present.

We claim:

1. A method of preparing poly(organophosphazenes) containing repeating units of the structure:

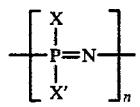

wherein X and X' are organic substituents which may be the same or different and n is from 20 to 50,000; which comprises reacting a poly(dichlorophosphazene) having the formula $-(NPCl_2)_n-$, in which n is from 20 to 50,000, with an active hydrogen-containing compound or mixture of active hydrogen-containing compounds in the presence of a bicyclic amidine represented by the structure:

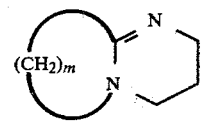

in which m is an integer of from 1 to 10.

2. The method of claim 1 wherein said poly(dichlorophosphazene) is a gelled poly(dichlorophosphazene).

3. The method of claim 1 wherein said active hydrogen-containing compound is selected from the group consisting of substituted or unsubstituted aliphatic alcohols, aromatic alcohols, polyether alcohols, amines, mercaptans and carbon acids and mixtures thereof.

4. The method of claim 1 wherein said active hydrogen-containing compound is a mixture of aromatic alcohols.

5. The method of claim 4 wherein said mixture of aromatic alcohols is a mixture of phenol and p-ethylphenol.

6. The method of claim 1 wherein said active hydrogen-containing compound is a polyether alcohol.

7. The method of claim 6 wherein said polyether alcohol is an alkylaryl polyether alcohol.

8. The method of claim 7 wherein said alkylaryl polyether alcohol is $C_8H_{17}C_6H_4(OC_2H_4)_3OH$.

9. The method of claim 4 wherein said mixture of aromatic alcohols is a mixture of p-chlorophenol and O-allylphenol.

10. The method of claim 1 wherein said bicyclic amidine is 1,5-diazabicyclo(5,4,0)undec-5ene.

11. The method of claim 1 wherein said active hydrogen-containing compound is a mixture of a fluoroalcohol and a carbon acid.

12. The method of claim 1 wherein said fluoroalcohol is trifluoroethanol and said carbon acid is malononitrile.

* * * * *